United States Patent [19]

Tsuchiya

[11] Patent Number: 4,491,889
[45] Date of Patent: Jan. 1, 1985

[54] CASSETTE TAPE PLAYER
[75] Inventor: Tatsuhiko Tsuchiya, Kakuda, Japan
[73] Assignee: Alps Electric Co., Ltd., Japan
[21] Appl. No.: 347,977
[22] Filed: Feb. 11, 1982
[30] Foreign Application Priority Data Feb. 14, 1981 [JP] Japan .................... 56-19437[U]

[51] Int. Cl.³ .................. G11B 5/54; G11B 21/22; G11B 5/008; G11B 15/00
[52] U.S. Cl. .................... 360/105; 360/96.6
[58] Field of Search ............ 360/105, 96.5, 96.6, 360/60, 137, 132

[56] References Cited

U.S. PATENT DOCUMENTS

| | | | |
|---|---|---|---|
| 4,109,286 | 8/1978 | Katsurayama et al. | 360/96 |
| 4,161,007 | 7/1979 | Haraguchi | 360/137 |
| 4,348,704 | 9/1982 | Takagi | 360/96.5 |
| 4,402,026 | 8/1983 | Yokota | 360/105 |
| 4,403,265 | 9/1983 | Okada | 360/105 |
| 4,405,962 | 9/1983 | Haruta | 360/96.6 |

*Primary Examiner*—Robert Martin Kilgore
*Attorney, Agent, or Firm*—Guy W. Shoup; Gerard F. Dunne

[57] ABSTRACT

A cassette tape player characterized in that a head base with a magnetic head disposed thereon is advanced by the closing operation of a cover openably disposed on a base, to bring the magnetic head into light touch with the surface of a cassette tape, whereby the starting position of a message recorded on the tape can be quickly determined.

24 Claims, 18 Drawing Figures

CASSETTE TAPE PLAYER

BACKGROUND OF THE INVENTION

The present invention relates to a cassette tape player which can be installed in an answering machine for a telephone or the like, and which can playback a message tape.

In general, in a cassette tape player for use with such an answering machine or the like, the starting position of a recorded message needs to be set when a cassette tape is loaded in the player. This operation is carried out in such a way that the position of the cassette tape is judged with a magnetic head held in light touch with the surface of the cassette tape, and that if necessary, the magnetic tape is fed rapidly past the magnetic field to adjust the tape to the starting position of the recorded message.

In the above operation, it has heretofore been necessary to perform the separate operations of depressing a button or the like after loading the apparatus with the cassette tape, and closing a cover.

In general, in a a cassette tape player, a base carrying the magnetic head slides to advance or retreat the magnetic head with respect to reel shafts. The magnetic head fixedly disposed on the base contacts head base in touch with the surface of the tape during playback or recording, and is kept clear of the tape surface at rest.

In the sliding operation of the base for the head, the magnetic head needs to move in a stable state without oscillating vertically.

Further, in general, a cassette tape often has a, piece disposed in the cassette case which can be removed when it is desired to prevent erasure of any recording on the tape. When the cassette tape is set on a tape player, a hook-shaped member intrudes into a cut-away portion resulting from removal of this piece of the cassette case, and a circuit preventing erroneous erasure of the tape is actuated by the operation of the hook-shaped member.

In microcassette tapes recently come into wide use, the piece for preventing erroneous erasure is disposed on a side surface of the cassette case. Accordingly, when the tape player is equipped with the typical hook-shaped member, this hook-shaped member often forms an obstacle in the direction of inserting the microcassette tape, resulting in the disadvantage that the tape loading may be troublesome.

SUMMARY OF THE INVENTION

An object of the present invention is to provide a cassette tape player in which a message starting position or the like can be immediately set when the cassette tape is loaded and a cover is closed.

Another object of the present invention is to provide a cassette tape player which can reduce the number of manual operations and promote automation.

Still another object of the present invention is to provide a cassette tape player in which a magnetic head can be stably moved to advance or retreat positions.

Still another object of the present invention is to provide a cassette tape player which is equipped with a guide mechanism of simple structure.

Yet another object of the present invention is to provide a cassette tape player which is equipped with a device preventing erroneous erasure utilizing the operations of opening and closing of the cover of the tape player.

Yet another object of the present invention is to provide a cassette tape player for an answering machine of a telephone, which is small in size and which is good in operability.

The present invention therefor is characterized in that a head base equipped with a magnetic head is advanced by the operation of closing a cover of a cassette apparatus, to bring the magnetic head into light touch with the surface of a cassette tape.

The present invention therefor is further characterized in that a leaf spring is fixedly disposed on a base along with a tape supporting bed for executing the positioning of a cassette and that the head base is pressed downward through a sphere by the leaf spring.

The present invention therefor is further characterized in that the operations of opening and closing a cover to overlie a microcassette tape is utilized so that when the cover is open, a hook mechanism for preventing erroneous erasure may be put aside and that when the cover is closed, the hook mechanism may abut on a side surface of the case of the microcassette tape.

Further objects and advantages of the present invention will become apparent from the following detailed description taken with reference to the drawings.

BRIEF DESCRIPTION OF THE DRAWINGS

The drawings illustrate an embodiment of the present invention, wherein.

PREFERRED EMBODIMENT OF THE INVENTION

Hereunder, an embodiment of the present invention will be described with reference to the drawings.

This apparatus is formed with a cassette loading portion 2 for setting a microcassette tape T in proper position the front part of the upper surface of a base 1. The cassette loading portion 2 is equipped with reel shafts $R_1$ and $R_2$, a magnetic head H, a pinch roller P, and other structures to be described below. On the other hand, the rear part of the upper surface of the base 1 forms a driving member-installing portion 3. The driving member-installing portion 3 is equipped with a motor $M_1$ for cue and review operations to rotate the reel shaft $R_1$ or $R_2$ at high speed, and a motor $M_2$ for a play operation which rotates the reel shaft $R_1$ at low speed. Further, the driving member-installing portion 3 is provided with a solenoid $S_1$ for moving the magnetic head H and the pinch roller P and another solenoid $S_2$ for releasing the brakes for the reel shafts $R_1$ and $R_2$. A cover 4 is disposed over the cassette loading portion 2.

Among various mechanisms of the tape player having such general construction, an interlocking mechanism for changing the position of the magnetic head H and the pinch roller P by opening or closing the cover 4 will be described below.

Figure 2:
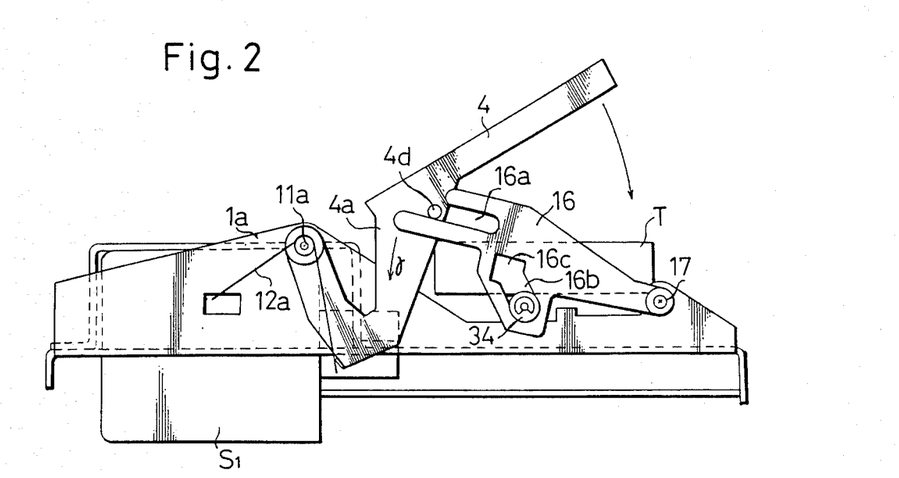
FIG. 2 is a left side view of the embodiment of FIG. 1.
Figure 3:
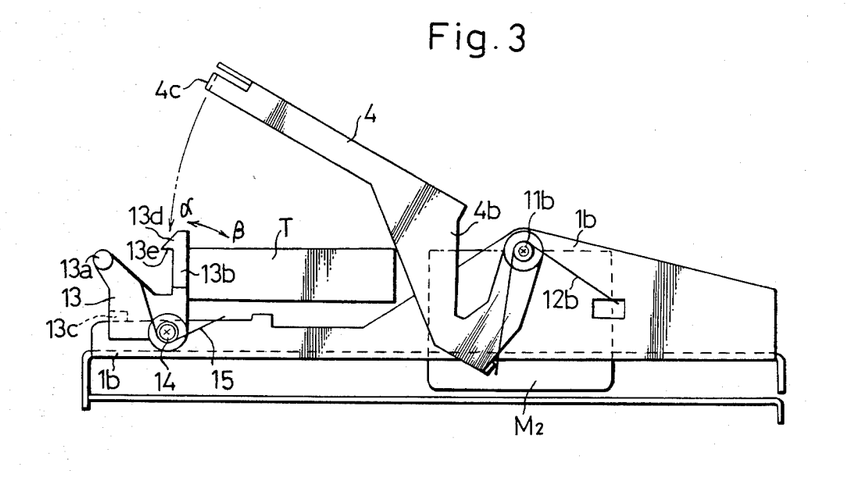
FIG. 3 is a right side view of the embodiment of FIG. 1.

The cover 4 is integrally formed with a pair of left and right legs 4a and 4b. One leg 4a is pivotally mounted on a left side plate 1a of the base 1 at a fulcrum 11a, as shown in FIG. 2, while the other leg 4b is pivotally mounted on a right side plate 1b of the base 1 at a fulcrum 11b, as shown in FIG. 3. Torsion springs 12a and 12b are respectively mounted on the fulcra 11a and 11b, and the cover 4 is normally urged in the direction of opening by the torsion springs 12a and 12b.

On the other hand, on the outer surface of the front end part of the right side plate 1b of the base 1, a locking member 13 is pivotally disposed at a fulcrum 14. The locking member 13 is integrally formed with a lever portion 13a and an arm portion 13b having an engaging side 13e adapted to engage a hook portion 4c formed at the front end of the cover 4 as the cover 4 is closed. A torsion spring 15 is retained at the fulcrum 14, and urges the locking member 13 in the direction of arrow $\alpha$ indicated in FIG. 3. In addition, a stopper 13c extends from the inner side of the locking member 13 and abuts on the upper edge of the right side plate 1b to determine the limit of movement of the locking member 13 in the direction $\alpha$.

Accordingly, when the microcassette tape T is loaded on the cassette setting portion 2 and thereafter the cover 4 is closed, the hook portion 4c of the cover 4 abuts against the upper oblique side 13d of the engaging arm portion 13b of the locking member 13. When the cover 4 is further moved in the closing direction, the locking member 13 turns in the direction of arrow $\beta$ under the guide action of the upper oblique side 13d. Thereafter, the hook portion 4c comes into engagement with the engaging side 13e of the engaging arm portion 13b, and the cover 4 is locked in the closed state. On the other hand, when the cover 4 is to be opened, the lever portion 13a of the locking member 13 is lifted to turn the locking member 13 in the direction $\beta$. As a result, the engagement between the engaging side 13e of the engaging arm portion 13b and the hook portion 4c of the cover 4 is released to unlock the cover 4, and this cover 4 is automatically opened by the forces of the torsion springs 12a and 12b.

In a somewhat fore part of the left side plate 1a of the base 1, a cam plate 16 is disposed. The cam plate 16 has its front end part pivotally mounted at a fulcrum 17, and has its rear end part formed with a guide slit 16a as shown in FIG. 2. A pin 4d having a diameter enabling it to enter the guide slit 16a extends laterally from the left side surface of the cover 4. Accordingly, when the cover 4 is turned in the closing direction, the pin 4d advances gradually in the guide slit 16a of the cam plate 16. In accordance with the inclination angle of the guide slit 16a, the cam plate 16 is turned in the direction of arrow $\gamma$ indicated in FIG. 2.

The cam plate 16 is provided with a guide groove 16b which serves to move the magnetic head H and the pinch roller P, and a square hole 16c is formed continuous to the upper end of the guide groove 16b.

Figure 1:
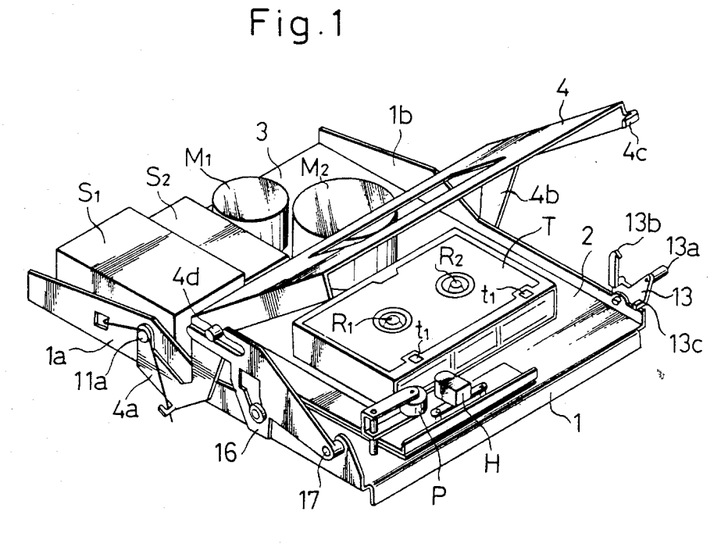
FIG. 1 is a perspective view of a cassette tape player.
Figure 4:
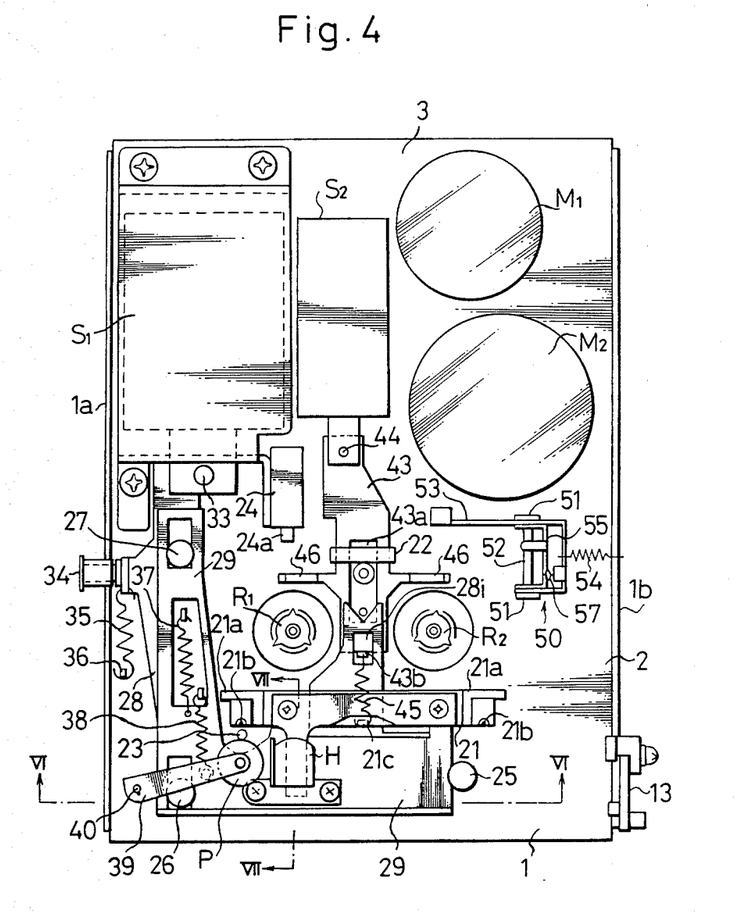
FIG. 4 is a plan view of the embodiment of FIG. 1.
Figure 5:
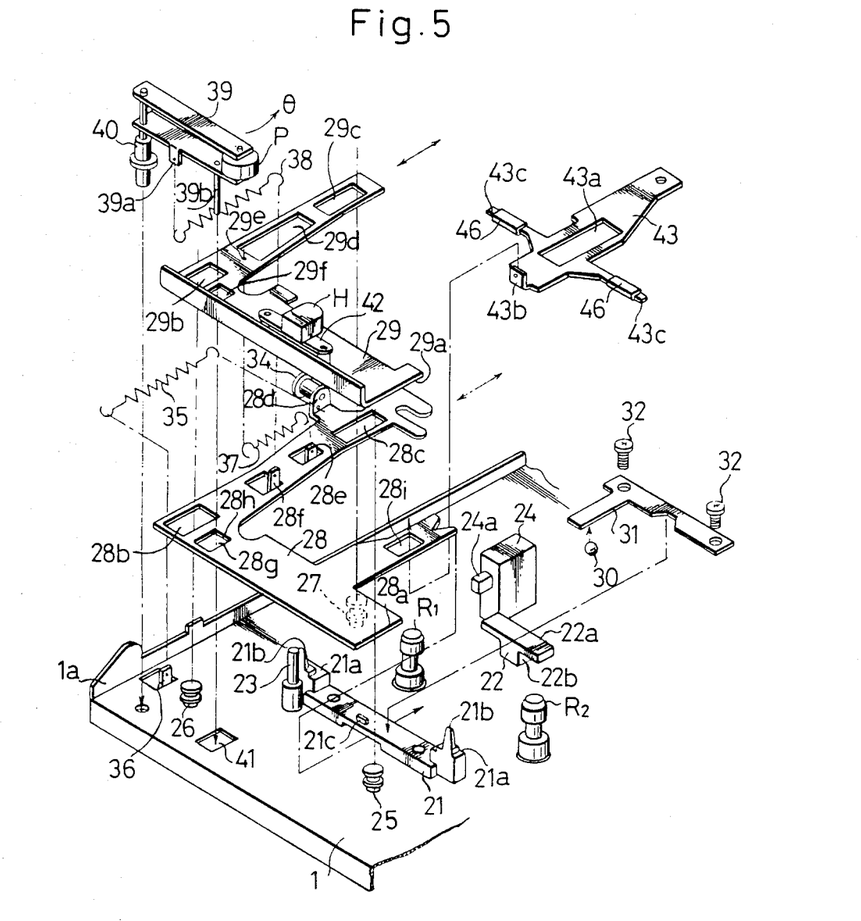
FIG. 5 is an exploded view of a head base operating mechanism.

As shown in FIGS. 4 and 5, the reel shafts $R_1$ and $R_2$ extend upwardly from the base 1. The reel shafts $R_1$ and $R_2$ are coupled with gears and a belt transmission mechanism (not shown) disposed under the base 1, and are driven by the motors $M_1$ and $M_2$ disposed in the driving member-installing portion 3. In front of the reel shafts $R_1$ and $R_2$, a tape supporting bed 21 made of a plastic material is fixedly disposed. Supporting flat surfaces 21a are formed at both the right and left ends of the tape supporting bed 21, and they are situated above the upper surface of the base 1. Behind the reel shafts $R_1$ and $R_2$, a rear supporting bed 22 is fixedly disposed. The upper surface 22a of the rear supporting bed 22 is at the same height as the supporting flat surfaces 21a. Thus, the lower surface of the microcassette tape T loaded as shown in FIG. 1 is supported by the supporting flat surfaces 21a of the tape supporting bed 21 and the upper surface 22a of the rear supporting bed 22. A pair of protuberances 21b extend upwardly from the supporting flat surfaces 21a of the tape supporting bed 21. In loading the microcassette tape T, the protuberances 21b fit within two apertures $t_1$ and $t_1$ of the microcassette tape T as shown in FIG. 1 to position the microcassette tape T. In front of one of the protuberances 21b, a capstan shaft 23 is disposed in proximity thereto. This capstan shaft 23 is also inserted into one aperture $t_1$ of the microcassette tape T along with adjacent protuberance 21b. The capstan shaft 23 is rotated at a peripheral speed corresponding to a tape feed speed during the tape play operation by the power transmission mechanism (not shown) disposed under the base 1, and holds the tape between it and the pinch roller P to carry out a tape feed operation. On the other hand, an actuating microswitch 24 is disposed behind the rear supporting bed 22. The actuator 24a of the microswitch 24 detects the presence of the loaded microcassette tape T.

Figure 6:
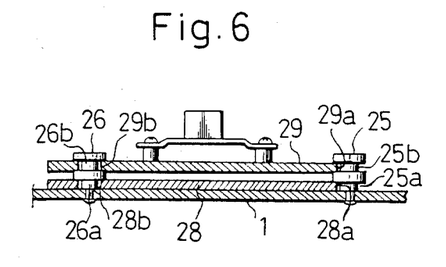
FIG. 6 is a sectional view taken along line VI—VI in FIG. 4.

Three guide pins 25, 26 and 27 are fixed to the base 1 and are essentially identical. As shown in FIG. 6, which is sectional view taken along line VI—VI in FIG. 4 showing the guide pins 25 and 26, the respective guide pins 25, 26 and 27 are formed with stepped portions 25a, 26a and 27a in their lower parts and also with stepped portions 25b, 26b and 27b above the stepped portions 25a, 26a and 27a. A slide plate 28 and a head base 29 are assembled one over the other on the upper surface of the base, 1 and are slidably supported by the guide pins 25, 26 and 27. More specifically, the slide plate 28 has its lower side surface 28a guided by the lower stepped portion 25a of the guide pin 25, its guide hole 28b by the lower stepped portion 26a of the guide pin 26, and its other guide hole 28c by the lower stepped portion of the guide pin 27. Similarly, the head base 29 has its lower side surface 29a guided by the upper stepped portion 25b of the guide pin 25, its guide hole 29b by the upper stepped portion 26b of the guide pin 26, and its other guide hole 29c by the upper stepped portion of the guide pin 27.

Figure 7:
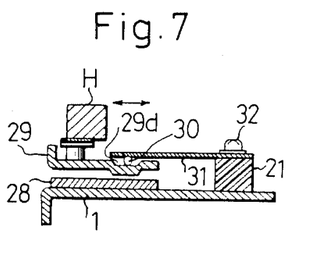
FIG. 7 is a sectional view taken along line VII—VII in FIG. 4.

A guide mechanism is also disposed in the central part of the head base 29. This mechanism is shown in FIG. 7 which is a sectional view taken along line VII—VII in FIG. 4. The central part of the head base 29 is formed with a recessed portion 29d which is elongated in the sliding direction, and on which a ball 30 is placed. The ball 30 is depressed by a leaf spring 31. The leaf spring 31 is fixed on the tape supporting bed 21 by screws 32. Accordingly, the head base 29 is pressed downward by the resilient force of the leaf spring 31, and any play which arises between the head base 29 and the stepped portions 25b, 26b and 27b of the respective guide pins 25, 26 and 27 are absorbed by the spring force. Therefore, when the head base 29 slides, the magnetic head H disposed on this head base is stable without moving upwardly or downwardly. During the slide of the head base 29, the ball 30 rolls, and hence, the friction between the head base 29 and the leaf spring 31 is very low.

The rear end of the slide plate 28 is coupled with a plunger of the solenoid $S_1$ by a pin 33 as shown in FIG. 4. Further, a bracket 28d (FIG. 5) is formed at the left side part of the slide plate 28 by bending a portion of the plate upwardly at a right angle. A roller 34 is rollably mounted on the bracket 28d. This roller 34 is inserted within the guide groove 16b formed in the cam plate 16 (FIG. 2). One end of a spring 35 is retained by the bracket 28d, while the other end of the spring 35 is retained by a spring stop 36 provided on the base 1. The spring 35 urges the slide plate 28 away from the solenoid $S_1$.

Further, a spring 37 has its one end retained by a spring stop 28e extending from the slide plate 28. This spring 37 emerges through and above the hole 29d of the head base 29 overlying the slide plate 28, and has its other end retained by a spring retaining aperture 29e of the head base 29. That is, the head base 29 and the slide plate 28 are coupled by the spring 37. The slide plate 28 is provided with another spring stop 28f. This spring stop 28f passes through the hole 29d and projects above the head base 29 so as to retain one end of a spring 38 overlying the head base 29. The other end of the spring 38 is retained by a lower end projection 39a of a roller bracket 39 supporting the pinch roller P. On the other hand, the roller bracket 39 is pivotally mounted on a pin 40 which is fixedly disposed on the base 1. A stop bar 39b is provided on the lower side of the roller bracket 39. This stop bar 39b passes through an escape hole 29f of the head base 29 as well as an engaging hole 28g of the slide plate 28 and is inserted into an escape hole 41 formed in the base 1.

The roller bracket 39 is urged by the force of the spring 38 to turn in a direction $\theta$ indicated in FIG. 5 with the pin 40 as a fulcrum. Since, however, the stop bar 39b abuts against one side 28h of the engaging hole 28g of the slide plate 28, the turning of the roller bracket 39 in the direction $\theta$ is restrained.

The head base 29 carries a head bracket 42 of fixed height, on which the magnetic head H is fixedly disposed.

Numeral 43 indicated in FIGS. 4 and 5 designates a brake plate. This brake plate 43 is centrally provided with a slide hole 43a, through which a base portion 22b of the rear supporting bed 22 (FIG. 5) is snugly fitted. Thus, the brake plate 43 is slidably mounted on the base 1. The brake plate 43 has its base end coupled with a plunger of the solenoid $S_2$ by a pin 44 (FIG. 4), and is formed with a hook 43b at its fore end. The hook 43b projects upward through a hole 28i of the slide plate 28, and a spring 45 (FIG. 4) is retained between this hook 43b and a protrusion 21c formed on the tape supporting bed 21. Arms 43c formed on respective sides of the brake plate 43 are provided with brake shoes 46 which are made of rubber or the like. When the solenoid $S_2$ is not energized, the brake shoes 46 abut against base part of both the reel shafts $R_1$ and $R_2$ by the force of the spring 45 so as to prevent these reel shafts $R_1$ and $R_2$ from racing.

Now, there will be described the operation of moving the head base 29 as well as the slide plate 28 by opening or closing the cover 4.

Figure 8A:
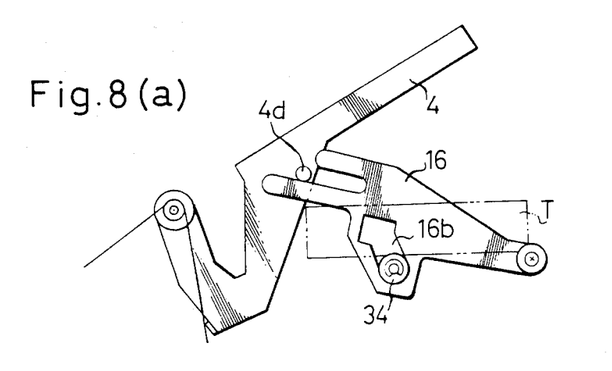
FIGS. 8(a), 8(b) and 8(c) are side views showing the operations of a cover and a cam plate in succession.
Figure 9A:
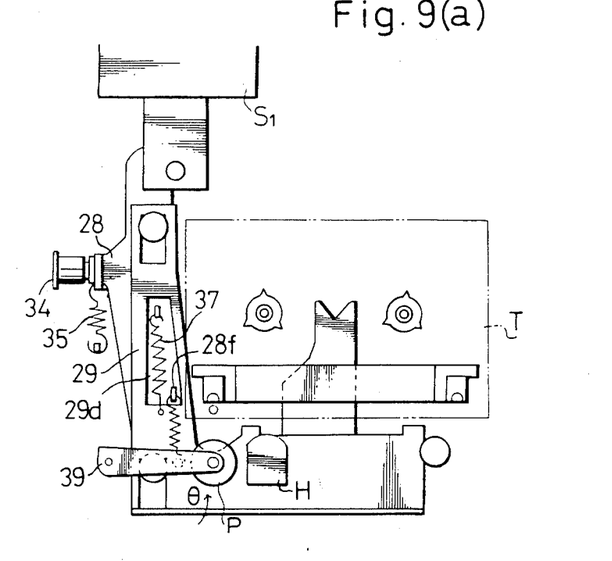
FIGS. 9(a), 9(b) and 9(c) are plan views showing the operations of a head base and a slide plate in succession.

As shown in FIG. 8(a), when the cover 4 is open, the cam plate 16 turns and stops at a position where it abuts against the pin 4d. At this time, as shown in FIG. 9(a), the slide plate 28 is returned by the force of the spring 35 because the solenoid $S_1$ is not energized. Therefore, the roller 34 mounted on the slide plate 28 retreats to the most right end of the guide groove 16b of the cam plate 16, as shown in FIG. 8(a). That is, the slide plate 28 retreats from the rollers $R_1$ and $R_2$ at this time. In addition, since the spring stop 28f protruded from the slide plate 28 abuts against the edge of the hole 29d of the head base 29, this head base 29 also retreats along with the guide plate 28. Accordingly, the magnetic head H is at rest at a position sufficiently separate from the loading position of the microcassette tape T. On the other hand, the pinch roller P retreats along with the slide plate 28 because the stop bar 39b disposed on the lower side of the roller bracket 39 abuts against the side 28h (FIG. 5) of the engaging hole 28g of the slide plate 28. In the state in which the cover 4 is opened, therefore, the magnetic head H and the pinch roller P retreat, and the microcassette tape T can be loaded or unloaded.

Figure 8B:
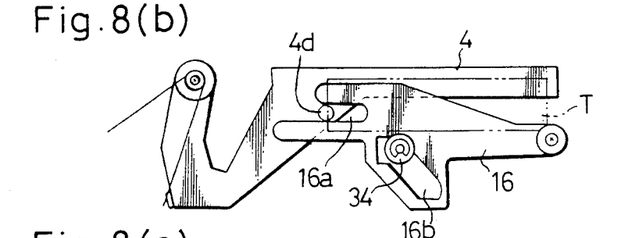
Figure 9B:
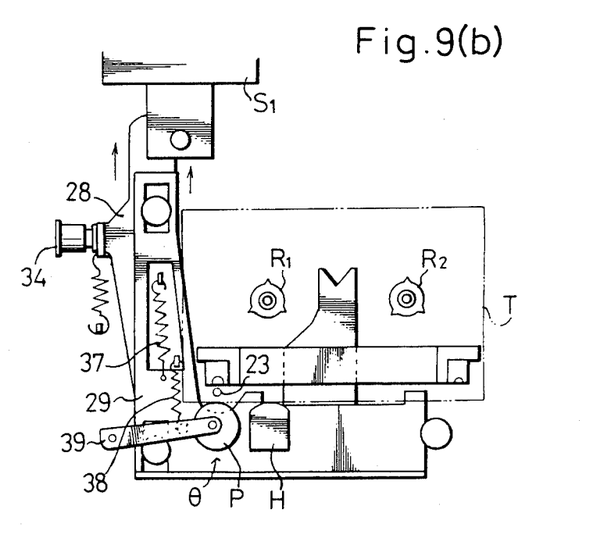

Subsequently, when the microcassette tape T is loaded and the cover 4 is closed, the pin 4d on the side surface of the cover 4 moves into the guide slit 16a of the cam plate 16 and turns this cam plate downward as illustrated in FIG. 8(b). In the state in which the cover 4 is fully closed, the guide slit 16a of the cam plate 16 assumes a horizontal posture. The roller 34 mounted on the slide plate 28 moves to the upper end position of the guide groove 16b with the turning of the cam plate 16. The slide plate 28 is therefore advanced slightly along with the roller 34 as illustrated in FIG. 9b. The head base 29 is also drawn by the spring 37 and advanced along with the slide plate 28. In the advanced state, the magnetic head H fixed on the head base 29 touches the surface of the microcassette tape lightly. The pinch roller bracket 39 is also drawn by the spring 38 and slightly turned in the direction $\theta$. The pinch roller P, however, does not come into touch with the capstan shaft 23 and is spaced from the tape surface.

The state in which the magnetic head H lies in light touch with the tape surface in this manner is the cue operation state. By way of example, in the case where the cassette apparatus is utilized for an answering mechanism telephone set, the recording position of the tape surface in contact with the magnetic head H can be detected. When the recording position is an intermediate position of a message, the motor $M_2$ can be actuated to rotate the reel shaft $R_1$ at high speed. Thus, the tape is fed forwardly or rewound rapidly to set the starting position of the message.

Figure 8C:
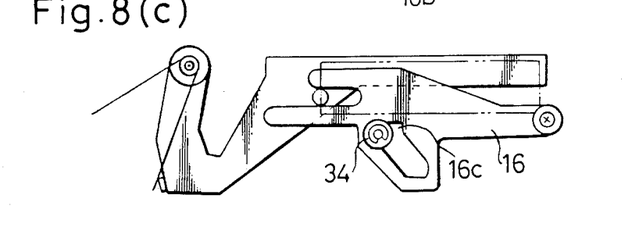
Figure 9C:
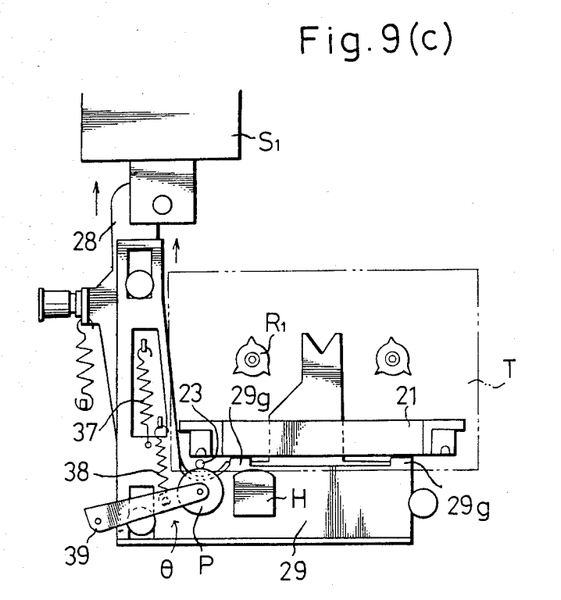

When a cassette play signal, for example, a signal at the call of the answering mechanism is issued, the solenoid $S_1$ is energized, and the slide plate 28 coupled with the plunger of the solenoid $S_1$ is further advanced. At this time, as shown in FIG. 8(c), the roller 34 mounted on the slide plate 28 moves to the leftmost end of the square hole 16c of the cam plate 16. As shown in FIG. 9(c), when the slide plate 28 advances, the head base 29 is also advanced by the spring 37. The head base 29, however, stops at a position where its end 29g abuts against the tape supporting bed 21. Further, the slide plate 28 advances a little more, and the difference of the amounts of movement is absorbed by the elongation of the spring 37. On the other hand, the roller bracket 39 is further turned in the direction θ by the advance of the slide plate 28 until the pinch roller P abuts against the capstan shaft 23. The pinch roller P lies in pressed contact with the capstan shaft 23 under a fixed force owing to the elongation of the spring 38, and the tape is held between the capstan shaft 23 and the pinch roller P. Simultaneously, the reel shaft $R_1$ and the capstan shaft 23 rotate at a fixed number of revolutions, and the tape is fed at a fixed speed. The magnetic head H advances along with the head base 29 to a position where it abuts on the tape surface under an appropriate force. At the position, a tape play or recording operation can be executed.

When the tape play signal stops as in case where the conversation with the answering service telephone has ended, the solenoid $S_1$ is deenergized to revert to the state of FIG. 9(b). The reel shaft $R_1$ is rotated at high speed, and the tape is fed rapidly to return to the starting position of the message.

Now, a mechanism 50 for preventing erroneous erasure will be described as to its construction and operation.

Figure 12:
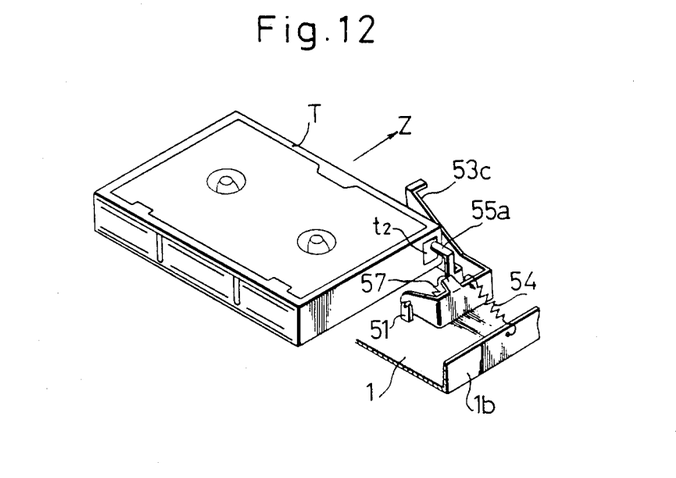
FIG. 12 is a perspective view showing the erroneous erasure preventing mechanism.

As shown in FIG. 12, of the microcassette tape T has a knock-out piece $t_2$ disposed on a side surface thereof and a mechanism for making impossible a new recording on the tape when the piece $t_2$ is bent and removed, is shown by reference numeral 50.

Figure 10:
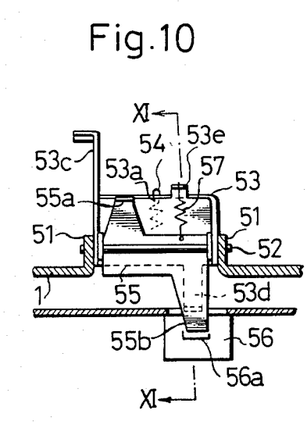
FIG. 10 is a left side view of an erroneous erasure preventing mechanism.
Figure 11A:
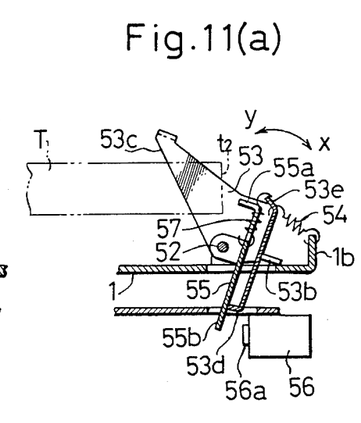
FIGS. 11(a), 11(b) and 11(c) are vertical sectional views for explaining the operation of the erroneous erasure preventing mechanism.

This mechanism 50 is shown in FIG. 4 and FIG. 10 (left side view) as well as FIG. 11(a) (sectional view taken along line XI—XI in FIG. 10). A shaft 52 is fixedly disposed across a pair of spaced supporting pieces 51 formed on the base 1 by bending portions of the base upwardly, and an outer fixture 53 which is bent generally into the shape of the letter U is pivotally mounted on the shaft 52. A spring retaining aperture 53a is provided in the upper edge part of the outer fixture 53, and a spring 54 is extended between the spring retaining aperture 53a and the right side plate 1b of the base 1 so as to urge the outer fixture 53 to turn in a direction x (FIG. 11(a)). The turning in the x direction is limited by a stopper 53b which extends laterally from the rear of the outer fixture 53 and is adapted to abuts on the upper surface of the base 1. One side surface of the outer fixture 53 is integrally formed with an arm 53c which extends upward. The arm 53c has a length sufficient to protrude upward beyond the upper surface of the microcassette tape T when the outer fixture 53 has turned fully in the x direction, as shown in FIG. 11(a). Further, the lower side of the outer fixture 53 is unitarily formed with an engaging piece 53d, which extends below the base 1.

An inner fixture 55 which is also formed into the shape of the letter U by bending is disposed inside the outer fixture 53. This inner fixture 55 is also pivotally mounted to the shaft 52. The upper end of the inner fixture 55 is integrally formed with a hook 55a which can abuts against the piece $t_2$ of the microcassette tape T. Further, an actuating piece 55b extends at the lower end of the inner fixture 55. This actuating piece 55b is directed to a position where it can operate an actuator 56a of an actuating microswitch 56 disposed under the base 1. Still further, a spring 57 is extended between the upper end of the inner fixture 55 and an upper end projection 53e of the outer fixture 53. Under the action of the spring 57, the inner fixture 55 is normally urged so as to turn in a direction y indicated in FIG. 11(a).

In the construction described above, when the cover 4 is open, no member presses the arm 53c of the outer fixture 53 as illustrated in FIG. 11(a), so that the arm 53c projects above the microcassette tape T. Under this state, the outer fixture 53 is turned fully in the x direction by the force of the spring 54. In contrast, the inner fixture 55 has the lower-end actuator piece 55b abutting on the lower-end engaging piece 53d of the outer fixture 53 and cannot turn in the y direction any more. In this state, accordingly, the upper end hook 55a of the inner fixture 55 is kept clear of the piece $t_2$ on the side surface of the microcassette tape T. That is, when the microcassette tape T is loaded in this state by inserting it in the direction of arrow z indicated in FIG. 12, the upper end hook 55a of the inner fixture 55 does not form any obstacle to the insertion of the microcassette tape T (FIG. 11(a)). Therefore, the operation of loading the microcassette tape is not hindered by the presence of the mechanism 50.

Figure 11B:
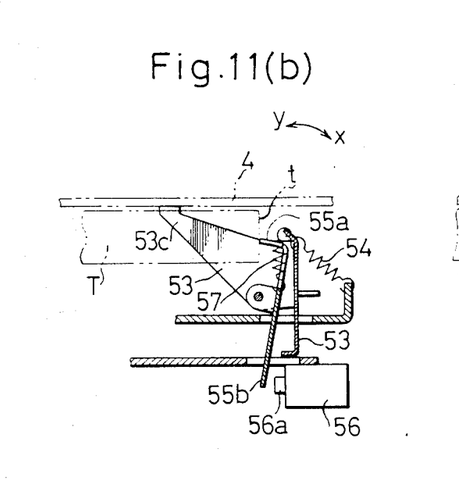

Subsequently, when the cover 4 is closed after loading the microcassette tape T, the arm 53c of the outer fixture 53 is depressed by the lower surface of the cover 4, and the outer fixture 53 is turned in the y direction. Also the inner fixture 55 is drawn by the spring 57 and is about to turn in the y direction along with the outer fixture 53. At this time, the upper end hook 55a of the inner fixture 55 abuts against the piece $t_2$ as illustrated in FIG. 11(b), and the inner fixture 55 is prevented from turning any further in the y direction. Therefore, the lower-end actuator piece 55b of the inner fixture 55 cannot operate the actuator 56a of the actuating microswitch 56, and circuit for preventing erroneous ereasure of the tape does not operate.

Figure 11C:
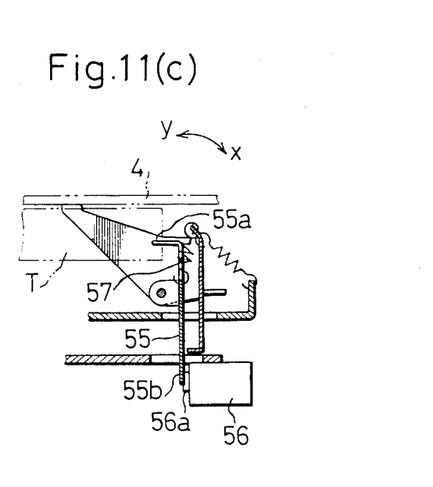

In contrast, when the piece $t_2$ of the microcassette tape T has been removed, the hook 55a of the inner fixture 55 can enter a cut-away portion formed by the missing piece $t_2$ when the outer fixture 53 turns in the y direction as illustrated in FIG. 11(c), so that the inner fixture 55 turns in the y direction to the utmost. Therefore, the lower-end actuator piece 55b of the inner fixture 55 operates the actuator 56a of the actuating microswitch 56. Consequently, the circuit preventing erasure of the tape operates at this time.

The present invention is not restricted to the foregoing embodiment, but various alterations in design will be possible without departing from the scope of the appended claims.

What is claimed is:

1. A cassette tape player comprising:
    a base carrying reel shafts adapted to receive a cassette tape;
    a head base disposed over said base and slidable in rectilinear movement towards and away from said reel shafts;
    a magnetic head disposed on said head base;
    a cover disposed on said base and adapted to be vertically opened and closed; and
    means including a cam mechanism disposed on said base for changing the opening and closing operations of said cover into rectilinear movement of said head base;
    so that when said cover is closed, said head base is moved to a position where said magnetic head is in light contact with a surface of a tape in said cassette.

2. A cassette tape player according to claim 1, further comprising slide means disposed on said base and carrying said head base, said slide means and said head base being coupled by a spring.

3. A cassette tape player according to claim 2, wherein said slide means is provided with a roller engaging said cam mechanism.

4. A cassette tape player according to claim 2, including means moving said slide means by the closing operation of said cover to the position where said magnetic head is in light touch with said surface of said cassette tape, and it thereafter moving said head base more by an operation of attracting a plunger of a solenoid disposed on said base.

5. A cassette tape player according to claim 3, wherein said cam mechanism is provided with a guide groove which engages said roller.

6. A cassette tape player according to claim 1, wherein a pin is formed on a side surface of said cover and is associated with said cam mechanism.

7. A cassette tape player according to claim 6, wherein said cam mechanism is provided with a guide slit which is associated with said cover.

8. A cassette tape player according to claim 1, wherein said cover is normally urged in its opening direction by a torsion spring.

9. A cassette tape player according to claim 8, wherein said cover is locked in its closed state by a locking member.

10. A cassette tape player comprising:
a base carrying reel shafts adapted to receive a cassette tape;
a head base disposed over said base and slidable in rectilinear movement towards and away from said reel shafts;
a magnetic head disposed on said head base;
a tape supporting bed disposed between said reel shafts and said head base for positioning a cassette in said tape player;
a guide mechanism for stably guiding the rectilinear movement of said head base, including a recess provided in an upper surface of said head base and elongated in the sliding directions of said head base;
a ball situated in said recess; and
a leaf spring disposed on said tape supporting bed in order to resiliently press said ball.

11. A cassette tape player according to claim 10, further comprising slide means disposed on said base, said head base being disposed on said slide means, and said slide means and said head base being coupled by a spring.

12. A cassette tape player according to claim 10, wherein said tape supporting bed is made of a plastic material and is integrally formed with supporting flat surfaces and protuberances at both right and left ends.

13. A cassette tape player according to claim 10, wherein said leaf spring is integrally formed with at least one arm portion, which resiliently presses said ball.

14. A cassette tape player according to claim 13, wherein said leaf spring is placed on said tape supporting bed, and said spring and said tape supporting bed are mounted on said base by identical members.

15. A cassette tape player according to claim 14, wherein said members are screws.

16. A cassette tape player comprising:
a base carrying reel shafts adapted to receive a cassette tape;
a cassette tape loading portion disposed over said base;
a shaft disposed sideward of said cassette tape loading portion;
an outer fixture turnably mounted on said shaft, said fixture being provided with an arm extending above a cassette tape loaded in said cassette tape loading portion, said arm being arranged to be depressed to actuate an erroneous-erasure-preventing sensing operation;
an inner fixture turnably mounted on said shaft and provided with a hook for sensing the presence of an erroneous-erasure-preventing piece of said cassette tape, said inner fixture being arranged so as to be kept clear of the position of said erroneous-erasure-preventing piece until the cassette tape is loaded on said loading portion;
first means for resiliently pressing said outer fixture in a direction in which said arm protrudes upward;
second means for resiliently pressing said inner fixture in a direction opposite to that of said outer fixture;
an actuating piece provided in a lower part of said inner fixture; and
a switch operated by said actuating piece.

17. A cassette tape player according to claim 16, wherein a cover which is disposed on said base and which can be vertically opened and closed can urge said arm of said outer fixutre so as to turn said outer fixture.

18. A cassette tape player according to claim 16, wherein said second means is a spring which is extended across said outer fixture and said inner fixture.

19. A cassette tape player according to claim 16, wherein said outer fixture is provided with a stopper for restaining its movement.

20. A cassette tape player comprising:
a base carrying reel shafts adapted to receive a cassette tape;
a head base disposed over said base and which can slide in rectilinear movement towards and away from said reel shafts;
a control member disposed on said base and which controls rotations of said reel shafts;
a roller bracket disposed over said base;
a pinch roller disposed on said roller bracket;
a magnetic head disposed on said head base;
slide means for moving said head base and said roller bracket to predetermined positions;
a cover disposed on said base; and
means including a cam mechanism disposed on said base for changing opening and closing operations of said cover into rectilinear movement of said slide means.

21. A cassette tape player according to claim 20, wherein said control member is constructed of a brake plate which is formed with arms on both its sides, said each arm being provided with a brake shoe.

22. A cassette tape player according to claim 21, wherein said brake plate is normally urged by a spring in a direction to control said reel shafts.

23. A cassette tape player according to claim 22, wherein said brake plate is coupled with a plunger of a solenoid to release its control when said solenoid is energized.

24. A cassette tape player according to claim 20, wherein said head base is coupled with said slide means by a spring, and said roller bracket is coupled with said slide means by a spring.

* * * * *